(12) United States Patent
Ullmann et al.

(10) Patent No.: US 8,578,840 B2
(45) Date of Patent: Nov. 12, 2013

(54) DISPENSING DEVICE FOR THE DISPENSING OF COFFEE AND/OR MILK AND/OR MILK FOAM, DRINK PREPARATION MACHINE WITH A DISPENSING DEVICE AND METHOD FOR THE ASSEMBLY OF A DISPENSING DEVICE

(75) Inventors: Erich Ullmann, Egerkingen (CH); Philip Buttiker, Oberbuchsiten (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 111 days.

(21) Appl. No.: 12/985,138

(22) Filed: Jan. 5, 2011

(65) Prior Publication Data

US 2011/0174162 A1 Jul. 21, 2011

(30) Foreign Application Priority Data

Jan. 19, 2010 (EP) .................... 10405010

(51) Int. Cl.
*A47J 31/40* (2006.01)
*B23P 17/04* (2006.01)

(52) U.S. Cl.
USPC .......................... 99/323.3; 99/323.1; 99/293

(58) Field of Classification Search
USPC ..................... 99/323.1, 323.3, 293
See application file for complete search history.

(56) References Cited

U.S. PATENT DOCUMENTS

| | | | | |
|---|---|---|---|---|
| 3,451,327 A * | 6/1969 | Nelson | | 99/453 |
| 4,160,002 A * | 7/1979 | Janovtchik | | 261/76 |
| 4,922,810 A * | 5/1990 | Siccardi | | 99/323.1 |
| 5,189,949 A * | 3/1993 | Apa | | 99/453 |
| 5,611,262 A * | 3/1997 | Rizzuto et al. | | 99/294 |
| 5,615,602 A * | 4/1997 | Schmed | | 99/323.1 |
| 5,738,002 A * | 4/1998 | Marano-Ducarne | | 99/293 |
| 5,862,740 A * | 1/1999 | Grossi | | 99/293 |
| 6,499,389 B1 * | 12/2002 | Probst | | 99/323.1 |
| 6,681,685 B2 * | 1/2004 | Mahlich | | 99/453 |
| 6,973,870 B2 * | 12/2005 | Alves | | 99/303 |
| 8,061,264 B2 * | 11/2011 | Turpin et al. | | 99/323.1 |
| 8,069,778 B2 * | 12/2011 | Gierth et al. | | 99/452 |
| 8,113,107 B2 * | 2/2012 | Fraij et al. | | 99/323.3 |
| 8,171,843 B1 * | 5/2012 | Heffington | | 99/282 |

(Continued)

FOREIGN PATENT DOCUMENTS

CH   685597 A5   8/1995
DE   10 2006 043 903 B3   2/2008

*Primary Examiner* — Joseph M Pelham
*Assistant Examiner* — Jimmy Chou
(74) *Attorney, Agent, or Firm* — Alston & Bird LLP

(57) ABSTRACT

A dispensing device for dispensing coffee, milk, and/or milk foam includes a first fluid duct for supplying coffee and a second fluid duct for supplying steam. The first fluid duct opens into one coffee discharge pipe. The second fluid duct has an outlet opening for steam. The dispensing device includes a mixing arrangement for mixing milk with steam and/or air, and a housing. The mixing arrangement includes a milk duct, air duct, inlet opening, and a discharge pipe. The housing partially surrounds the fluid ducts, discharge pipe, and mixing arrangement, and includes a first and second housing part. The first housing part houses the fluid ducts, and the second housing part includes a recess for the mixing arrangement. The mixing arrangement may be positioned relative to the second fluid duct to produce a fluid connection between the second fluid duct outlet opening and the mixing arrangement inlet opening.

12 Claims, 8 Drawing Sheets

(56) References Cited

U.S. PATENT DOCUMENTS

| | | | |
|---|---|---|---|
| 2006/0237859 A1* | 10/2006 | Lopez et al. | 261/76 |
| 2007/0243305 A1* | 10/2007 | Marconi | 426/596 |
| 2008/0022860 A1* | 1/2008 | Turpin et al. | 99/290 |
| 2008/0216665 A1* | 9/2008 | Hoehne et al. | 99/293 |
| 2009/0007795 A1* | 1/2009 | Turpin et al. | 99/293 |
| 2010/0011968 A1* | 1/2010 | Fin et al. | 99/323.1 |
| 2010/0107891 A1* | 5/2010 | Vanderstegen-Drake et al. | 99/323.1 |
| 2010/0147158 A1* | 6/2010 | Muller | 99/300 |
| 2010/0199851 A1* | 8/2010 | Fuenten et al. | 99/293 |
| 2010/0236416 A1* | 9/2010 | Bonsch et al. | 99/280 |
| 2011/0100230 A1* | 5/2011 | Cheng | 99/293 |

* cited by examiner

DISPENSING DEVICE FOR THE DISPENSING OF COFFEE AND/OR MILK AND/OR MILK FOAM, DRINK PREPARATION MACHINE WITH A DISPENSING DEVICE AND METHOD FOR THE ASSEMBLY OF A DISPENSING DEVICE

CROSS-REFERENCE TO RELATED APPLICATION

This application claims priority to European Patent Application No. 10405010.9, filed Jan. 19, 2010, which is hereby incorporated herein in its entirety by reference.

FIELD

Embodiments of the invention relates to a dispensing device for the dispensing of coffee and/or milk and/or milk foam, a drink preparation machine with such a dispensing device, and a method for the assembly of such a dispensing device.

BACKGROUND

Drink preparation machines are known in which various fluids such as coffee, milk and/or milk foam, hot water or steam are dispensed by means of various dispensing devices which—separated from each other spatially—are arranged at various positions on the respective drink preparation machine. In this case, a drinking vessel must be placed accordingly at various positions respectively beneath the respective dispensing device which is intended for the dispensing of the respectively required fluid. For the preparation of a cappuccino drink, for example, the drinking vessel must firstly be placed beneath a device for the dispensing of milk foam and one must wait for the supply of the milk foam. The drinking vessel must then be placed beneath a coffee discharge pipe for the coffee to be dispensed. To brew a drink of tea, the drinking vessel must be placed beneath a hot water and/or steam discharge pipe, separate from the coffee discharge pipe. This placing changeover of the drinking vessel is inconvenient and time-consuming for a user. In addition, such drink preparation machines require a relatively large amount of space.

DE 10 206 043 903 B3 discloses a hot drink machine for the preparation of cup portions with an outlet for the hot drink and with a further outlet for hot steam and/or milk foam. Here, one of the outlets is movable, so that the ends of the outlets are directed vertically into the same cup, with the outlet for the hot drink being movable horizontally in relation to the outlet for hot steam and/or milk foam. There is a disadvantage herein that two different outlets must be fastened independently of each other on the housing of the hot drink machine and consequently a complex mechanism is required for the movement of the respective outlets. In addition, such a hot drink machine also requires a relatively large space, especially since the various outlets are arranged adjacent to each other.

CH 685597 A5 discloses an outlet head for a coffee machine apparatus which contains outlet openings for milk foam, a coffee drink and hot water respectively. The milk foam is produced here inside a chamber which is integrated into the outlet head. The milk which is required for the preparation of the milk foam must be heated outside the outlet head and pumped to the outlet head through ducts which are arranged in the interior of the coffee machine apparatus. For reasons of hygiene, in particular the parts which come in contact with milk must be cleaned relatively frequently, with a range of individual parts of the outlet head or of the coffee machine apparatus having to be dismantled for cleaning purposes. In the present case, a disadvantage consists in that relatively many different parts of the outlet head and parts arranged inside the coffee machine apparatus come in contact with milk and must be dismantled separately from each other for cleaning purposes. For this reason, the dismantling of these parts before cleaning, the cleaning of these parts per se and the mounting of these parts after cleaning has been completed is complicated and time-consuming and requires extensive detailed knowledge on the part of a user of the coffee machine apparatus with regard to the construction of the outlet head and of the coffee machine apparatus.

SUMMARY

The invention is based on the problem of avoiding the disadvantages which have been mentioned and of providing a dispensing device for the dispensing of coffee and/or milk and/or milk foam and if applicable further fluids, which is compact in construction and is able to be dismantled quickly and simply into individual parts, in order to be able to easily clean parts of the dispensing device which come in contact with milk during operation. In addition, a corresponding method is to be proposed for the assembly of this dispensing device.

This problem is solved by a dispensing device according to one embodiment of the invention with the features of Claim 1.

This embodiment of a dispensing device comprises a group of fluid ducts for the supply of several fluids (designated "fluid duct group" hereinbelow), which fluid duct group comprises at least a first fluid duct for the supply of coffee and a second fluid duct for the supply of steam, wherein the first fluid duct opens out into a coffee discharge pipe and the second fluid duct has an outlet opening for the steam. Furthermore, the dispensing device comprises a mixing arrangement for the mixing of milk with steam and/or air, which mixing arrangement comprises a chamber, a milk duct for the supply of milk into the chamber, an air duct for the supply of air into the chamber, an inlet opening for the supply of steam into the chamber and a discharge pipe for the dispensing of milk and/or milk foam out from the chamber. Furthermore, the dispensing arrangement comprises a housing which at least partially surrounds the fluid duct group, the coffee discharge pipe and the mixing arrangement, with the mixing arrangement being able to be brought into a first predetermined position relative to the second fluid duct, in which position a fluid connection is produced between the outlet opening of the second fluid duct and the inlet opening of the mixing arrangement for the supply of steam into the chamber.

According to embodiments of the invention, the housing of the dispensing device comprises at least a first housing part and a second housing part, wherein the fluid duct group is arranged on the first housing part or is constructed in the first housing part, and in the second housing part a recess is constructed to receive the mixing arrangement, into which recess the mixing arrangement is able to be received such that the mixing arrangement is held in a second predetermined position relative to the second housing part. Furthermore, the first housing part and the second housing part are able to be assembled together such that, if the mixing arrangement is received into the recess in the second housing part, the mixing arrangement assumes the first predetermined position relative to the second fluid duct. The latter causes a fluid connection to be produced between the outlet opening of the second fluid duct and the inlet opening of the mixing arrangement for the supply of steam into the chamber on assembling together of the first housing part and of the second housing part.

This dispensing device is composed of few, simple to assemble elements and can therefore be dismantled quickly and simply, in particular for cleaning. Here, the first housing part is generally connected permanently with a drink preparation machine. In the first housing part, advantageously there are no elements which come in contact with milk, so that a cleaning of the first housing part and of the fluid ducts arranged in this housing part is noncritical. The cleaning of all the units and ducts of the drink preparation machine which come in contact with milk should take place very thoroughly and in particular in short time intervals from the point of view of hygiene and to avoid endangering health. The same applies to external units and ducts which come in contact with milk and can be used for supplying the mixing arrangement with milk, for example a milk storage container and a milk tube which connects the milk storage container with the mixing arrangement.

In the dispensing device according to embodiments of the invention, the mixing arrangement is the only component which is brought in contact with milk during operation. Advantageously, the mixing arrangement can be installed as a whole into the housing of the dispensing device and can be removed as a whole out from the housing of the dispensing device.

Embodiments of the invention simplify in particular the installation of the mixing arrangement into the housing, in particular in the case of cramped space conditions in the housing. The installation of the mixing arrangement into the housing is simplified in that the housing is composed of two parts which can be assembled together, the first housing part and the second housing part, and before assembling together the first housing part and the second housing part, the mixing arrangement merely has to be placed in the recess which is constructed in the second housing part. For a user, the placing of the mixing arrangement on the second housing part is a procedure which is simple to monitor, which requires no particular manual skills. Furthermore, the assembling together of the first housing part and the second housing part is able to be carried out quickly and simply, especially since a user can easily monitor the assembling together of the housing parts from the exterior and generally can see immediately whether the housing parts are assembled together correctly, so that the mixing arrangement is ready for operation. The first housing part and the second housing part can be shaped for example so that they are only able to be assembled together—able to be seen immediately by a user—when the second housing part (within predetermined tolerances) is brought into a single predetermined spatial position relative to the first housing part. The disposing of the mixing arrangement relative to the second housing part makes it possible that the mixing arrangement is automatically connected correctly to the second fluid duct for the supply of steam on the first housing part, when the first housing part and the second housing part are assembled together. An installation of the mixing arrangement in the dispensing device is therefore able to be carried out quickly, free of error and without studying an operating manual. For a user, in particular it is not necessary to grasp the mixing arrangement by hand and to guide it precisely such that the desired fluid connection between the outlet opening of the second fluid duct and the inlet opening of the mixing arrangement is produced for the supply of steam. As the user merely has to grasp the housing parts and can easily monitor a correct assembling together of the housing parts, the user is in particular protected from his hands being able to come in contact with fluid ducts which can be heated during operation. This is advantageous in particular when the mixing arrangement has to be placed closely adjacent to the fluid ducts or closely adjacent to the coffee discharge pipe.

The number of steps for dismantling the dispensing device according to embodiments of the invention is very small. This has the advantageous effect that the user is able to dismantle the dispensing device quickly and the mixing arrangement, which is the only component which comes in contact with milk, is quick and simple to clean. For this purpose, a user merely has to separate the second housing part from the first housing part. The mixing arrangement is then accessible and can be grasped manually by the user and separated from the first housing part or respectively from the second housing part and then cleaned. For example, the mixing arrangement can be cleaned under running water or can be placed for a short time into a cleaning bath.

The dispensing device is preferably arranged vertically adjustably on a drink preparation machine, in order to be able to fill drinking vessels of various sizes without difficulty. A further advantage of the vertical adjustability consists in that the second housing part can be separated particularly simply from the first housing part, when the latter is previously moved as far upwards as possible. The latter is advantageous in particular when the dispensing device is arranged on a drink preparation machine such that the first housing part is an upper part of the housing of the dispensing device and the second housing part is a lower part of the housing, and the second housing part must be moved downwards in order to separate the second housing part from the first housing part.

In a further embodiment of the dispensing device, the fluid duct group additionally contains a third fluid duct for the supply of hot water, which opens out into a hot water discharge pipe which is guided out from the first housing part. Therefore, the hot water discharge pipe and the third fluid duct, connected therewith, are only contained in the first housing part and do not have to be removed on dismantling of the second housing part. Hereby, advantageously the number of components which are to be dismantled is small, so that the dismantling is able to be carried out simply. Furthermore, this embodiment has the advantage that it is compact in construction and apart from a dispensing of coffee and/or milk and/or milk foam also makes possible a dispensing of hot water into a drinking vessel which is positioned at a predetermined position beneath the dispensing device.

In a further embodiment of the dispensing device, the first housing part comprises at least one guidance element and the second housing part a counter-guidance element, wherein on assembling together the first housing part and the second housing part, the respective guidance element is able to be brought into engagement with the counter-guidance element, such that the first housing part and the second housing part are guided respectively against each other along a predetermined path. Preferably the guidance element and the counter-guidance element form a linear guide, so that the first housing part and the second housing part are respectively guided along a straight path. The guidance element and the corresponding counter-guidance element are in a correlation such that the second housing part is able to be placed against the first housing part and is able to be mounted onto the first housing part in so far as the respective guidance element is brought into engagement with the counter-guidance element. This arrangement of the guidance element and of the counter-guidance element ensures in addition that the two housing parts can only be assembled together in so far as the respective guidance element is brought into engagement with the counter-guidance element. An accidental incorrect assembling together of the first housing part and the second housing part can therefore be avoided, especially since a user can easily monitor whether the respective guidance element is brought into engagement with the counter-guidance element or not, and whether the first housing part and the second housing part are guided against each other along a predetermined path or not. Hereby, a possible source of error in assembling is eliminated, e.g. a twisting of the second housing part relative to the first housing part. Through the fact that the first housing part and the second housing part are guided by means of the guidance element and the counter-guidance element respectively against each other along a predetermined path, it is additionally ensured that the mixing arrangement is guided precisely on assembling together the first housing part and the second housing part, so that it can be ensured that the mixing arrangement is moved in a controlled manner in the direction of the outlet opening of the second fluid duct such that a fluid connection is produced between this outlet opening and the inlet opening of the mixing arrangement for the supply of steam.

The guidance element can be constructed for example as a track connected with the first or second housing part or formed thereon, which runs in longitudinal direction to the respective housing part. In this example, the corresponding counter-guidance element can be realized as a slot formed in the other housing part, which likewise extends in longitudinal direction in a region of this housing part. Here, the cross-section profile of the track corresponds to the cross-section profile of the slot.

In a further development of the above-mentioned embodiment, the guidance element and the counter-guidance element are constructed such that the guidance element is only able to be brought into engagement with the counter-guidance element when the second housing part is situated (within predetermined tolerances) in a predetermined position relative to the first housing part. In this way, it is enforced that the first housing part and the second housing part are only able to be assembled together when these housing parts are positioned relative to each other in a single predetermined manner. Otherwise, an assembling together of the two housing parts is prevented. Following the above example, for example the track and the slot can be constructed and positioned accordingly such that any incorrect bringing together between the first and second housing parts is prevented. For example, an undesired (incorrect) placing of the second housing part onto the first housing part can be prevented by a track, arranged on one of the housing parts, abutting against an obstacle arranged on the other respective housing part, so that an assembling together of the two housing parts is prevented. Therefore, it is previously indicated to the user that the assembly with this incorrect positioning does not lead to the desired objective. Consequently, the user is led to choose the correct positioning for assembly. Thereby, a malfunction and/or damage to the drink preparation machine is avoided. In addition, it is avoided that hot liquids, such as for example freshly brewed coffee, can emerge in an uncontrollable manner and possibly scald the user.

A further embodiment of the dispensing device is constructed such that the second housing part contains a guidance arrangement which is designed such that the coffee discharge pipe, on assembling together of the first housing part and the second housing part, is able to be brought at least partially in engagement with the guidance arrangement. Preferably, the coffee discharge pipe is a body extending in a straight line in its longitudinal direction and the guidance arrangement is designed as a linear guide for this body. Such an arrangement of the coffee discharge pipe, which is connected with the first housing part and hence forms a unit, and the guidance arrangement which is contained in the second housing part, ensures an always exact placement of the second housing part onto the first housing part. An assembling together of the first and second housing parts is only possible in this case when the coffee discharge pipe (within predetermined tolerances) is brought into engagement with the guidance arrangement and is moved in a direction predetermined by the guidance arrangement.

In a further embodiment of the dispensing device, the first or second housing part contains at least one snap connection arrangement with a catch which is able to be brought into engagement with an engaging section which is mounted on the other respective housing part. Therefore, the second housing part can be connected quickly and in an easily detachable manner with the first housing part. In addition, when looking at the respective arrangement between snap connection arrangement or respectively catch and engaging section, the user can easily detect at which positioning the second housing part is to be placed onto the first housing part.

In a further embodiment of the dispensing device, the mixing arrangement contains a guidance section and the second housing part comprises a recess, wherein the recess is shaped such that the guidance section is able to be brought into a secure engagement with the recess. Therefore, the mixing arrangement can only be inserted into the second housing part with correct positioning. For this, the user does not require any information at all, because on visual inspection of the guidance section, constructed on the mixing arrangement, and of the recess constructed on the second housing part, he immediately recognizes which spatial position the mixing arrangement must assume relative to the second housing part, so that the guidance section can be brought into a secure engagement with the recess.

A further advantage consists in that through the cooperation between the guidance section and the recess, a secure hold can be provided between the mixing arrangement and the second housing part. In a preferred variant, the guidance section is brought into engagement with the recess such that the mixing arrangement is held in the second predetermined position relative to the second housing part. In order to provide a particularly secure hold between the mixing arrangement and the second housing part, a groove can be constructed along the contour of the recess. In addition, the guidance section can be shaped such that the guidance section or a part of the guidance section is situated inside the groove, when the guidance section is brought into engagement with the recess. Alternatively, a groove can also be constructed along the contour of the guidance section and the recess can be shaped such that a region of the second housing part is situated in the region of the recess inside the groove when the guidance section is brought into engagement with the recess. In the above-mentioned examples, the groove provides for a particularly secure hold of the mixing arrangement. For example, the outer sides of the guidance section and of the second housing part can be shaped such that the outer side of the guidance section terminates at least partially flush with the outer side of the second housing part.

In a further variant of the above-mentioned embodiment, the milk duct comprises an end section with an inlet opening for milk, with the guidance section being arranged on this end section. This variant has the advantage that the mixing arrangement and the second housing part can be constructed in a particularly space-saving manner.

The coffee discharge pipe is preferably contained in a body which contains on an end section an electric light source. Therefore, an optimum illumination of a drinking vessel placed beneath the dispensing device is ensured. This illumination serves to assist the user in particular in a dark environment in placing the drinking vessel correctly so that the drink which is let out flows solely into the drinking vessel. The electric light source is connected with electric leads which run inside the body which contains the coffee pipe, and are guided and held inside the first housing part. With a separation of the second housing part from the first housing part, therefore advantageously no electric leads are exposed, which may possibly be damaged. The electric leads for the supply of the electric light source are therefore protected from damage by mechanical stresses.

A further embodiment of the dispensing device is constructed such that the second housing part contains a first opening through which an end section of the discharge pipe for the dispensing of milk and/or milk foam is able to be inserted, and a second opening through which an end section of the coffee discharge pipe is able to be inserted. Here, the positions and the circumferences of the discharge pipe for the dispensing of milk and/or milk foam and of the coffee discharge pipe and in addition the positions and circumferences of the two openings are selected such that the mixing arrangement can only be inserted into the respective opening with an exact positioning in relation to the second housing part. In addition, it is thereby made possible that the first housing part and the second housing part can only be assembled together when the mixing arrangement is positioned correctly relative to the first housing part and to the second housing part.

The above-mentioned problem can also be solved by a method for the assembly of the above-mentioned dispensing device according to embodiments of the invention in accordance with Claim 13.

This method contains the steps: inserting the mixing arrangement into the second housing part and assembling together the second housing part and the first housing part. Hereby, the dispensing device can be dismantled quickly and simply into few individual parts for cleaning the mixing arrangement. In addition, the dispensing device can be assembled again very quickly and without error after the cleaning of the mixing arrangement.

Preferably, the mixing arrangement is inserted into the second housing part such that an end section of the discharge pipe for the dispensing of milk and/or milk foam is guided through an opening which is constructed in the second housing part. Hereby, the mixing arrangement can be inserted into the second housing part quickly and simply, with an intuitively correct positioning, on assembly of the dispensing device.

The mixing arrangement is preferably inserted into the second housing part such that a guidance section arranged on the mixing arrangement is brought in secure engagement with a recess constructed on the second housing part. Therefore, it is advantageously ensured that the mixing arrangement is always inserted correctly into the second housing part. In addition, the mixing arrangement can be held permanently by the second housing part without the assistance of further fastening arrangements. For example, the outer side of the guidance section in the inserted state can terminate at least partially flush with the outer side of the second housing part.

The second housing part is preferably placed onto the first housing part such that at least one guidance element, which is constructed on the first housing part, is brought into engagement with a counter-guidance element constructed on the other housing part. Thus it is avoided that the first and the second housing parts are accidentally mounted or assembled together incorrectly.

Preferably, on assembling together the second housing part and the first housing part, the coffee discharge pipe is brought at least partially into engagement with a guidance arrangement which is constructed on the second housing part. Thus the second housing part can be placed quickly and simply onto the first housing part, with the second housing part being partially guided during this placement. Thereby, an incorrect mounting of the dispensing device is avoided.

The dispensing device according to embodiments of the invention can be used in a drink preparation machine for the preparation of coffee specialties.

BRIEF DESCRIPTION OF THE FIGURES

Further details of the invention and in particular example embodiments of the dispensing device according to the invention are explained below with the aid of the enclosed drawings, in which are shown.

DETAILED DESCRIPTION

Figure 1A:
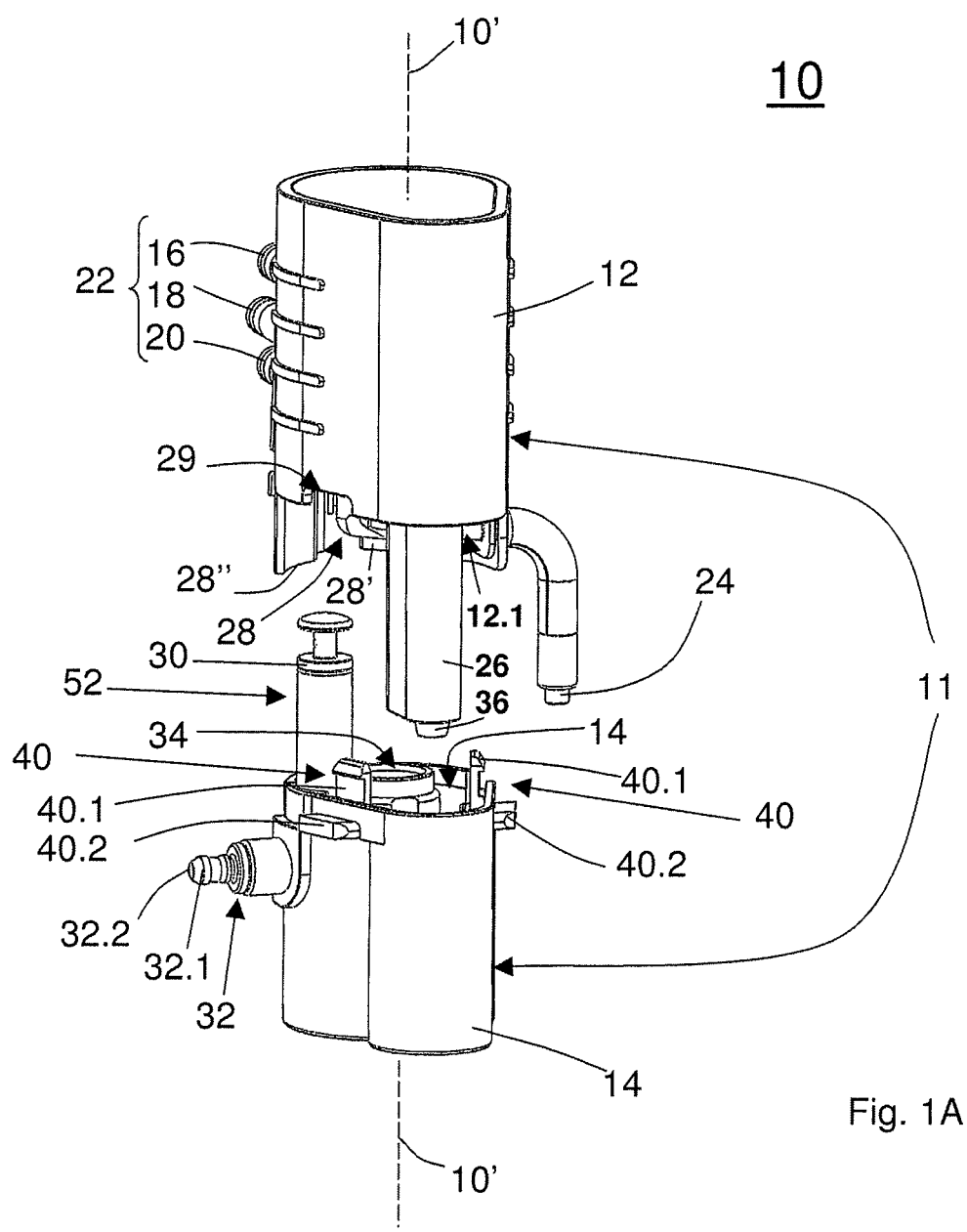
FIGS. 1A and 1B illustrate a dispensing device according to embodiments of the invention, with a coffee discharge pipe, a mixing arrangement for the mixing of milk with steam and/or air and with a housing able to be assembled together from a first and a second housing part, with the housing parts being separated from each other.
Figure 1B:
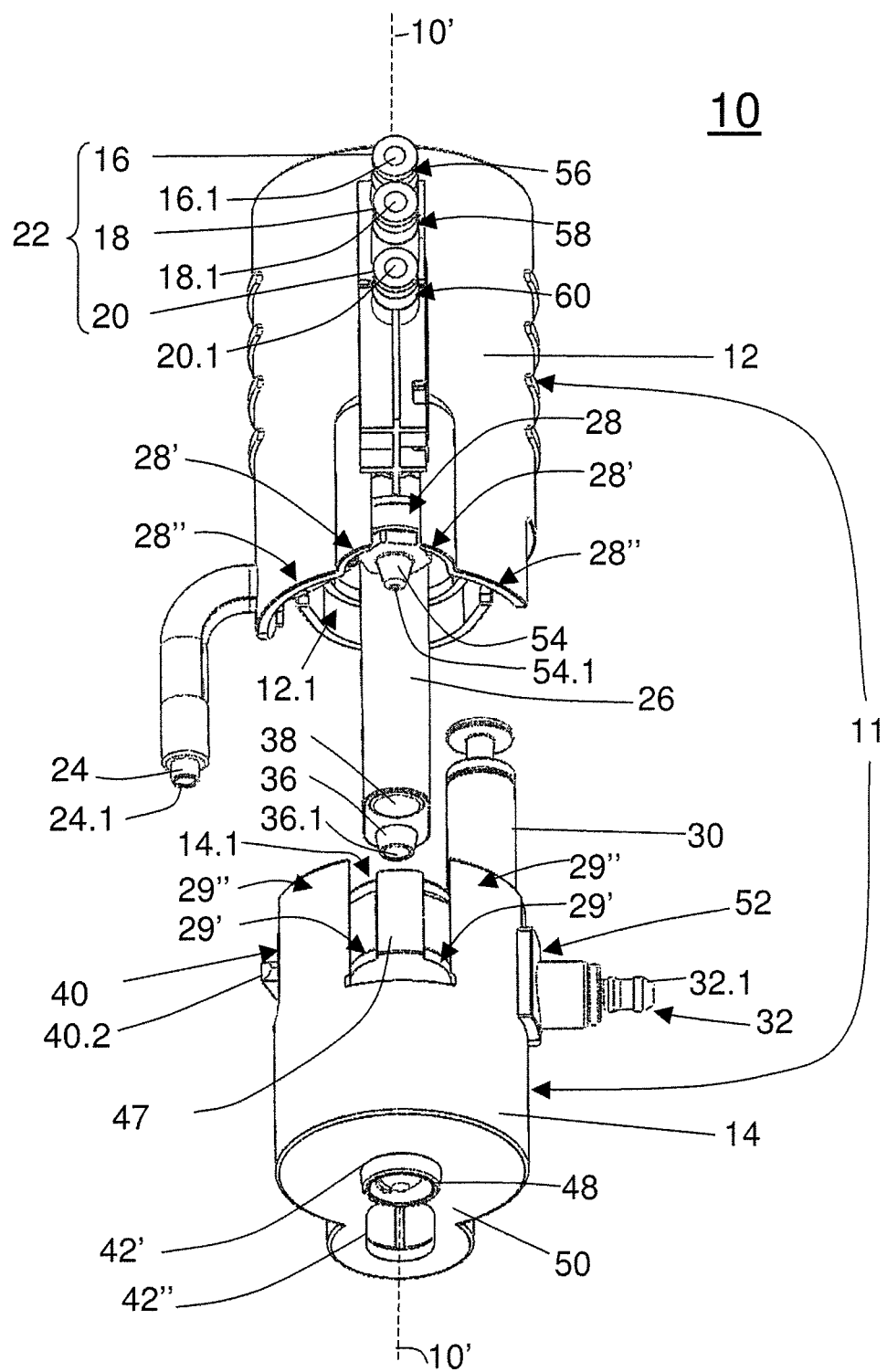

FIGS. 1A and 1B show a dispensing device 10 for the dispensing of coffee and/or milk and/or milk foam and hot water. As FIGS. 1A and 1B indicate, the dispensing device 10 has a longitudinal axis 10' which (as indicated in FIGS. 1A and 1B) is preferably aligned parallel to a vertical. The dispensing device 10 comprises inter alia a housing 11 which is composed of a first (upper) housing part 12 and a second (lower) housing part 14. As will be further explained below, the two housing parts 12 and 14 can be assembled together such that the second housing part 14 is held detachably on the first housing part 12. In the case of FIGS. 1A and 1B, the housing 11 is illustrated in a situation in which the first housing part 12 and the second housing part 14 are separated from each other. The first housing part 12 can be arranged (if applicable in a vertically adjustable manner) on a drink preparation machine (not shown in FIGS. 1A and 1B).

As FIG. 1A, 1B indicate, the dispensing device 10 comprises a group 22 of several fluid ducts (designated "fluid duct group 22" hereinbelow): a first fluid duct 56 for coffee, a second fluid duct 58 for steam and a third fluid duct 60 for hot water. As can be further seen from FIGS. 1A, 1B and 4, the first housing part 12 has an interior 12.1. The fluid ducts 56, 58 and 60 run at least partially through this interior 12.1. In addition, the fluid ducts 56, 58 and 60 respectively have an end section with an inlet opening for a fluid, which inlet opening is accessible from an outer side of the first housing part 12, so that the respective fluid ducts 56, 58 or respectively 60 can be supplied with the respective fluid (coffee, steam or respectively hot water) via the respective inlet openings: The first fluid duct 56 has for example an end section 16, projecting from the first housing part 12, having an inlet opening 16.1 for coffee, to which end section a duct can be connected for the supply of coffee. Correspondingly, the second fluid duct 58 has an end section 18, projecting from the first housing part 12, having an inlet opening 18.1 for steam, to which end section a duct can be connected for the supply of steam. Correspondingly, the third fluid duct 60 has an end section 20, projecting from the first housing part 12, having an inlet opening 20.1 for hot water, to which end section a duct can be connected for the supply of hot water.

Figure 4:
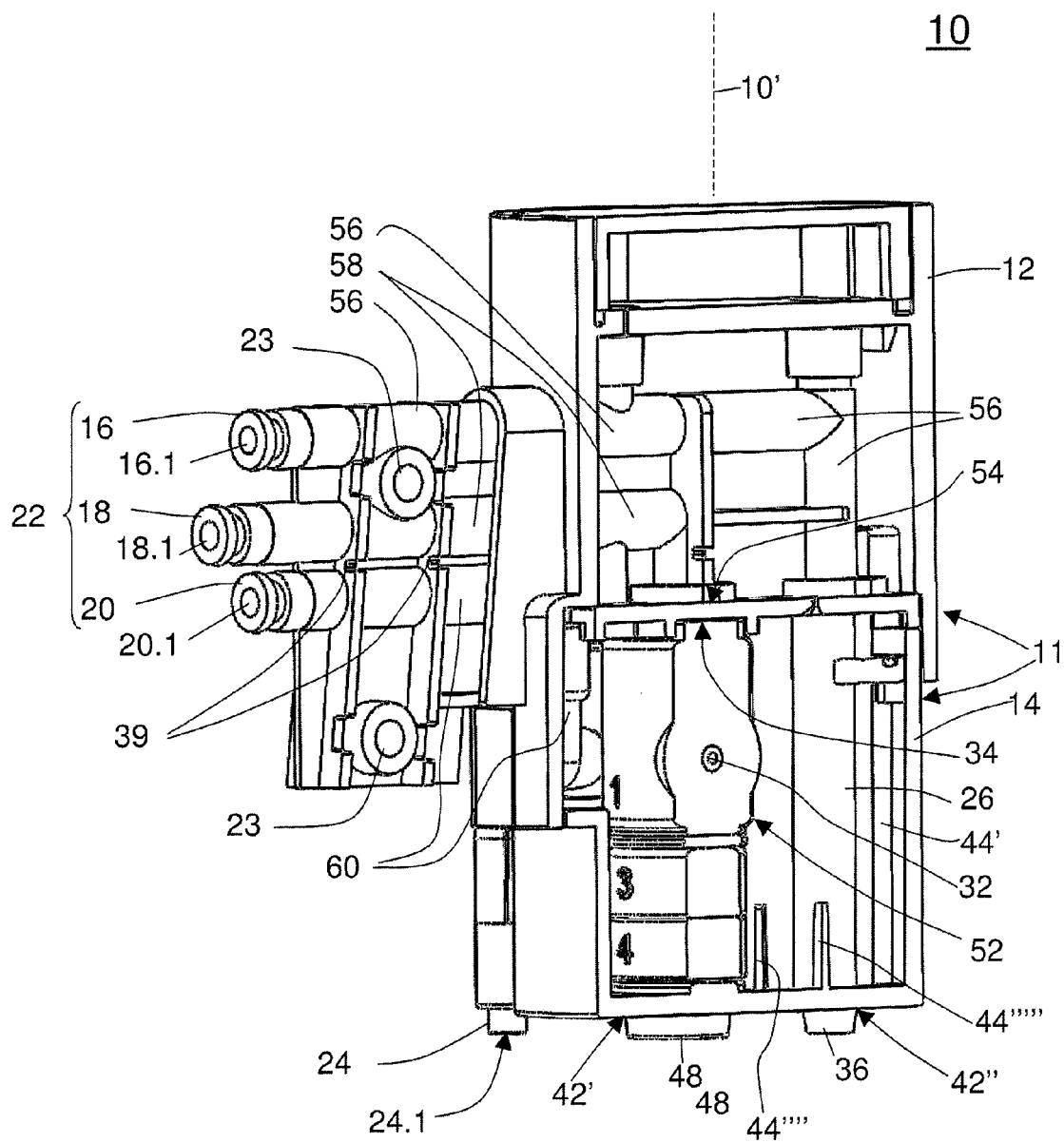
FIG. 4 is a section view of the dispensing device according to FIG. 3.

As FIGS. 1A and 4 indicate, the first fluid duct 56 opens out into a coffee discharge pipe 36, which is constructed in a rod-shaped body 26, projecting in a straight line from the first housing part 12, and has at an end section of the body 26 an outlet opening 36.1 for coffee.

As FIGS. 1B and 4 indicate, the second fluid duct 58 opens out at an end remote from the inlet opening 18.1 into a steam nozzle 54, which comprises an outlet opening 54.1 for steam.

The above-mentioned third fluid duct 60 opens out in a hot water discharge pipe 24, which has on an end section an outlet opening 24.1 for hot water. As FIGS. 1A and 1B indicate, the coffee discharge pipe 36 and the hot water discharge pipe 24 are preferably arranged respectively in a region adjoining the respective outlet opening 36.1 or respectively 24.1 parallel to a vertical, in order to make possible as undisturbed a flow as possible of coffee out of the outlet opening 36.1 or respectively of hot water out of the outlet opening 24.1. Thus, a drinking vessel (not shown) placed beneath the dispensing device 10 can receive alternatively coffee from the coffee discharge pipe 36 or hot water (for example for the preparation of a tea drink) from the hot water discharge pipe 24.

The first housing part 12 and the second housing part 14 can be assembled together to form a unit by the second housing part 14 being moved parallel to the longitudinal axis 10' in the direction of the first housing part 12. In order to achieve the first housing part 12 and the second housing part 14 always being assembled together correctly, a region of the first housing part 12 is constructed as a guidance element which guides the second housing part 14 on assembling together parallel to the longitudinal axis 10'. As FIGS. 1A and 1B indicate, in a region beneath the inlet openings 16.1 or respectively 18.1 or respectively 20.1 of the fluid duct group 22, the first housing part 12 has a slot 28 extending parallel to the longitudinal axis 10' and has on both sides adjacent to the slot in each case two wall regions 28', 28", curved in a convex manner, arranged adjacent to each other, likewise extending parallel to the longitudinal axis 10' and within a plane perpendicular to the longitudinal axis 10'. The slot 28 and the wall regions 28' and 28" have the function of a linear guide, which makes it possible to guide the second housing part 14 parallel to the longitudinal axis 10' (linearly), when the second housing part 14 and the first housing part 12 are to be assembled together. As FIG. 1B indicates, the second housing part 14 comprises in each case two wall regions 29', the outer side of which is constructed respectively in a complementary manner to the inner side of the respective wall region 28' of the first wall part 12, and in each case two wall regions 29", the outer side of which is constructed respectively in a complementary manner to the inner side of the respective wall region 28" of the first wall part 12.

As FIG. 1B indicates, the second housing part 14 comprises a cross-piece 47 extending parallel to the longitudinal axis 10', which is constructed in a complementary manner to the slot 28: The cross-piece 47 is dimensioned such that it can be introduced parallel to the longitudinal axis 10' into the slot 28 and is guided inside the slot parallel to the longitudinal axis 10'. In order to be able to assemble together the first housing part 12 and the second housing part 14, the outer side of the respective wall region 29" of the second housing part 14 must be brought in contact with the inner side of the respective wall region 28" of the first housing part 12, and the outer side of the respective wall region 29' of the second housing part 14 must be brought in contact with the inner side of the respective wall region 28' of the first housing part 12. Furthermore, the cross-piece 47 of the second housing part 14 must be introduced into the slot 28 in the first housing part 12. Only when the wall regions 28', 28", 29' and 29', the slot 28 and the cross-piece 47 are arranged relative to each other as mentioned above, is it possible to assemble together the first housing part 12 and the second housing part 14. In this context, the wall regions 28' and 28" and the slot 28 can be regarded as guidance elements of the first housing part 12 and the wall regions 29' and 29' and the cross-piece 47 can be regarded as (complementary) counter-guidance elements of the second housing part 14. The named guidance or respectively counter-guidance elements are respectively arranged such that an accidental incorrect assembly of the second housing part 14 with the first housing part 12 is avoided.

As FIGS. 1A and 1B further indicate, the second housing part 14 contains a mixing arrangement 52 for the mixing of milk with steam and/or air, which can be inserted from above into a recess 14.1 constructed in the second housing part 14. The mixing arrangement 52 can only be partially seen in FIGS. 1A and 1B and will be explained in further detail below (in particular in connection with FIGS. 4 and 5). As FIGS. 1A and 1B indicate, the mixing arrangement 52 comprises an inlet opening 34 for steam, an air suction fitting with an air duct 30 for the suction of air, and a milk duct 32 for the supply of milk, which milk duct has an end piece 32.1 with an inlet opening 32.2 for milk. In addition, the mixing arrangement has a chamber (not shown) which is in fluid connection with the air duct 30, the milk duct 32 and the inlet opening 34. In order to supply steam to the mixing device 52, the inlet opening 34—as will be further explained below—can be placed onto the steam nozzle 52. If a steam is thus supplied into the chamber via the inlet opening 34, then an underpressure is produced in the chamber according to the Venturi principle. This underpressure then makes provision that milk, which can be prepared for example in a milk storage container (not shown), is sucked in via the milk duct 32. In addition, external air is sucked in via the air duct 30. In the mixing device 52 a mixture of steam, milk, and air is formed, which contains heated milk and/or milk foam and can be dispensed via a discharge pipe 48 of the mixing device 52.'

The second housing part 14 can be connected detachably with the first housing part 12 by means of snap connection arrangements 40. The respective snap connection arrangement 40 comprises a catch 40.1 which can be deflected from a position of rest by actuating a button 40.2 which is accessible from the exterior of the dispensing device 10. On the inner side of the first housing part 12, corresponding shaped engaging sections are constructed (for example in the form of a recess which is not shown in the figures), with which the catches 40.1 of the respective snap connection arrangements 40 can be securely in engagement, in order to hold the second housing part 14 against the first housing part 12. As FIG. 1A indicates, the first housing part 12 has recesses 29 on the lower edge, which extend in the direction of the longitudinal axis 10' and are shaped and arranged such that respectively a recess 29 can receive a button 40.2 of one of the respective snap connection arrangements 40, when the first housing part 12 and the second housing part 14 are assembled together. The respective recesses 29 serve accordingly likewise as guidance elements, which can guide the second housing part 14 (by means of the respective button 40.2) in the direction of the longitudinal axis 10' and prevent the first housing part 12 and the second housing part 14 from being able to be incorrectly assembled together.

FIG. 1B shows the dispensing device 10 illustrated in FIG. 1A in a position rotated through 180° about the longitudinal axis 10' from a view from obliquely below. In this view, the coffee discharge pipe 36 and in particular the arrangement of the outlet opening 36.1 for coffee at an end section of the body 26 can be seen. In addition, alongside the outlet opening 36.1, an electric light source 38 can be seen on the end section of the body 26. The second housing part 14 contains on an underside 50 two openings 42', 42". An end section of the discharge pipe 48 of the mixing device 52 is inserted through the first opening 42'. The end section of the body 26 (together with the outlet opening 26.1 and the electric light source 38) is able to be inserted through the second opening 42".

Figure 2:
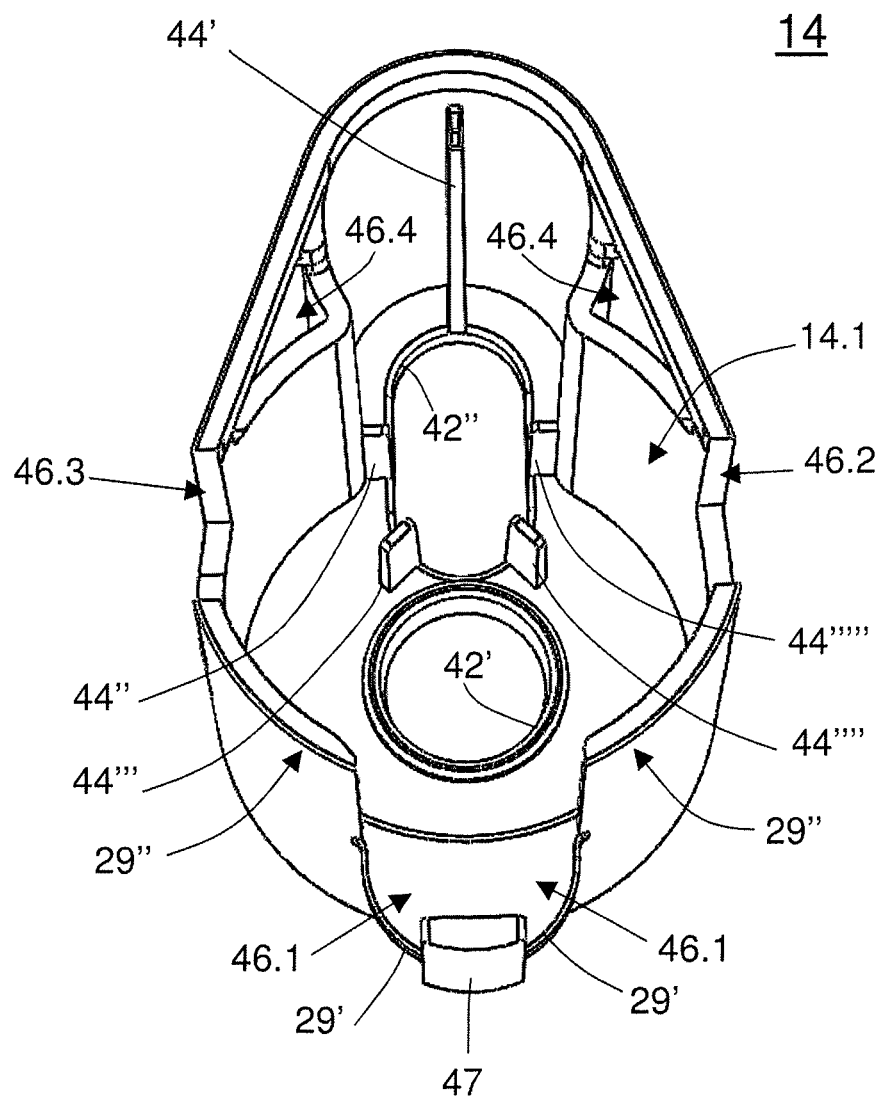
FIG. 2 is a perspective top view onto the second housing part according to FIG. 1A, 1B.

FIG. 2 shows a perspective top view onto the second housing part 14. As can be seen, the second housing part 14 comprises a recess 14.1 which offers space to receive the mixing arrangement 52 (not illustrated) and the body 26 (not illustrated). In FIG. 2 the first opening 42', which is arranged centrally, and the second opening 42" can be seen, which is arranged staggered with respect thereto. An end section of the discharge pipe 48 of the mixing device 52 (not shown) is able to be inserted through the first opening 42'. The end section of the body 26 (not shown) is able to be inserted through the second opening 42". At the edge of the second opening 42" guide ribs 44'-44''''' are arranged, which guide the end section of the body 26 on assembling together the second housing part 14 and the first part 12. As FIG. 2 shows, the second housing part 14 has several recesses 46.1-46.4 on the upper edge. The two recesses 46.1 correspond with the two wall regions 28' of the first housing part and offer space to receive respectively one of the wall regions 28', when the first housing part 12 and the second housing part 14 are assembled together along the longitudinal axis 10'. The recess 46.2 serves for the passage of the milk duct 32 of the mixing arrangement 52 for the case where the mixing arrangement 52 is inserted into the recess 14.1 (as illustrated in FIGS. 1A and 1B). The recess 46.3 offers space to receive the hot water discharge pipe 24 for the case where the first housing part 12 and the second housing part 14 are assembled together. Each of the recesses 46.4 offers space to receive a button 40.2 of one of the snap connection arrangements 40 (not illustrated).

Figure 3:
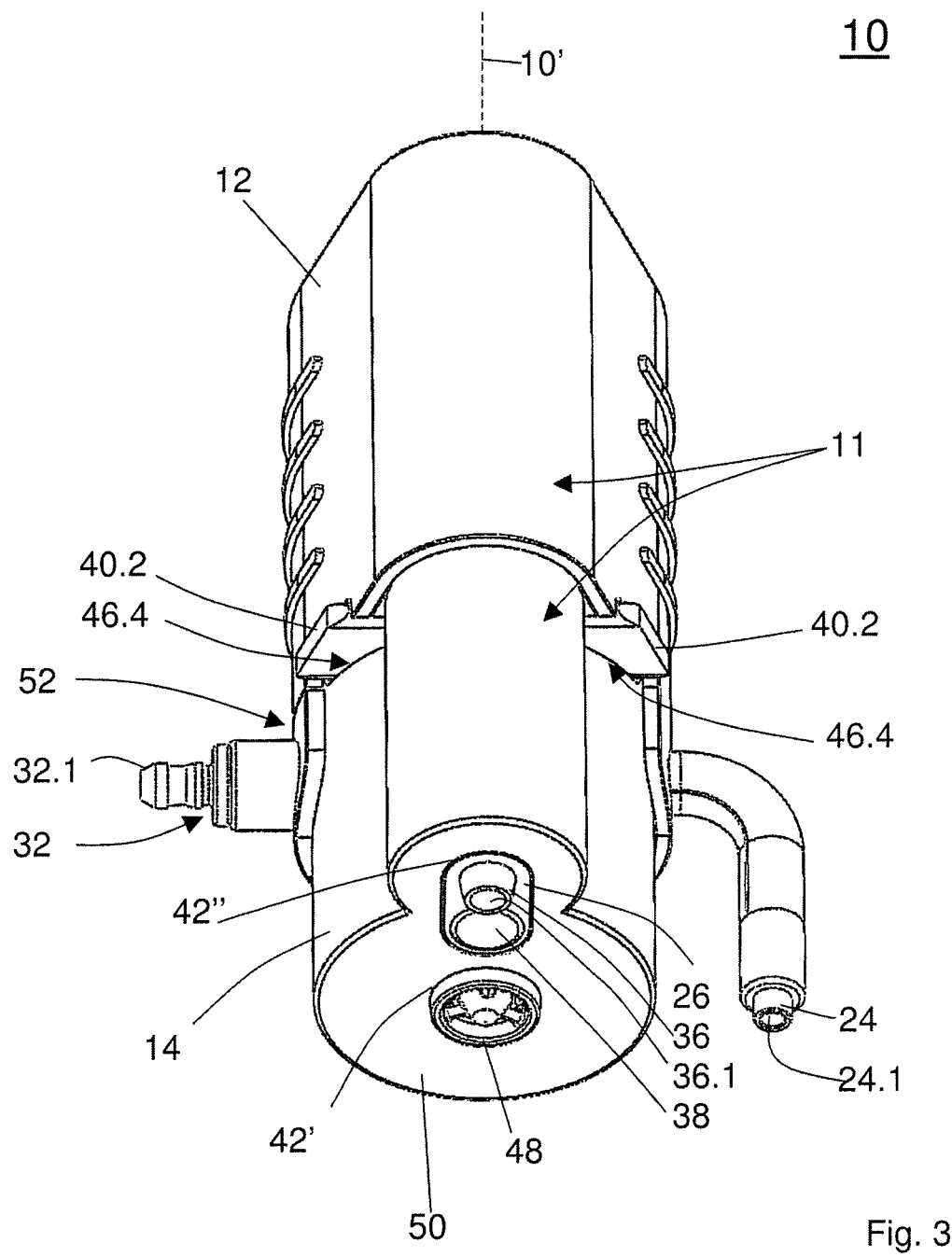
FIG. 3 is a view of the dispensing device according to FIG. 1A, wherein the first and the second housing parts are assembled together, in a worm's eye view.

FIG. 3 shows a view of the dispensing device 10 in a worm's eye view. In this illustration the first housing part 12 and the second housing part 14 are in the assembled state, wherein the mixing arrangement 52 is inserted into the first housing part 14. As can be seen particularly well in this illustration, the end sections of the discharge pipe 48 for milk and/or milk foam and of the coffee discharge pipe 36 are arranged close to each other such that the outflowing fluids can flow into a drinking vessel without the latter having to be placed at different locations. Therefore, milk foam and coffee can be dispensed substantially at the same time, without the drinking vessel having to be moved. The hot water discharge pipe 24 is guided out from the first housing part 12 initially horizontally and then deflected downwards through 90°. A dispensing of hot water is drawn from the hot water discharge pipe 24 for the preparation of drinks of tea, for example. The end sections of the discharge pipe 48 and of the body 26 are guided through the openings 42' and 42" illustrated in FIG. 2 on the lower side 50 of the second housing part 14. The coffee discharge pipe 36 and electric leads (not shown) for the electrical supply of the electric light source 38 run inside the body 26. This electric light source 38, which can be a lamp or a LED, serves for the illumination of a drinking vessel placed beneath the dispensing device 10. Therefore, the dispensing of drinks can also be observed or respectively monitored with little ambient light.

As described above, with a dismantling of the second housing part 14 from the first housing part 12, the body 26 remains on the first housing part 12. This also has the advantage that no electric leads or elements for guiding or holding the electric leads for the supply of the electric light source 38 have to be moved or displaced. Thus, for example, the likelihood of a lead breakage of the electric leads is greatly reduced. As FIG. 3 indicates, the mixing device 52 is substantially completely surrounded by the housing parts 12 and 14, apart from the end section 32.1 of the milk duct 32 and an end section of the body 26 which project through corresponding openings or respectively recesses in the respective housing parts. For the supply of milk, on the end section 32.1 of the milk duct 32 a milk tube (not shown) can be connected, which is immersed at its other end into a milk storage container.

FIG. 4 shows the dispensing device 10 in a view in section in longitudinal direction, which makes a view into the interior of the dispensing device 10 possible. In this case, the first housing part 12 and the second housing part 14 are assembled together such that the second housing part 14 is held on the first housing part 12 by means of the snap connection arrangements 40 (not shown in FIG. 4). In FIG. 4 in particular the path of the already mentioned first fluid duct 56 for coffee, the second fluid duct 58 for steam and the third fluid duct 60 for hot water can be seen in the interior of the dispensing device 10. In addition, the mixing arrangement 52, inserted into the second housing part 14, can be seen. On the underside of the mixing arrangement 52, the discharge pipe 48 for milk and/or milk foam is arranged, with a section of the discharge pipe 48 projecting through the opening 42'. On the upper side of the mixing arrangement 52 the inlet opening 34 for steam 52 is arranged, which in the present case is placed onto the already mentioned steam nozzle 54 such that the inlet opening 34 is connected with the steam nozzle 54 in a sealed manner and steam can enter into the mixing arrangement 52 from the second fluid duct 58 via the steam nozzle 54 and the inlet opening 34. In order to supply the second fluid duct 58 with steam, a steam supply duct (not shown) can be connected onto the end section 18 of the second fluid duct 58, which steam supply duct may be flexible, for example. FIG. 4 further shows the first fluid duct 56, which is connected with the coffee discharge pipe 36 running in the body 26. For example, the first fluid duct 56 and the body 26 can be constructed in one piece. In the present case, an end section of the coffee discharge pipe 36 projects through the opening 42" in the lower part of the second housing part 14. FIG. 4 further indicates that the body 26 is brought in contact with the guide ribs 44', 44'''', 44''''' and the remaining guide ribs 44" and 44''' not illustrated in FIG. 4 (see FIG. 2), so that the body 26 is clearly guided on the guide ribs 44'-44''''' when the first housing part 12 and the second housing part 14 are assembled together. The section of the first fluid duct 56, guided outside the first housing part 12 terminates—as already mentioned—in the end section 16, onto which, to supply the first fluid duct 56 with coffee, a flexible duct for the supply of coffee can be connected. The first housing part 12 further contains the third fluid duct 60 for hot water, which opens out in the hot water discharge pipe 24 which is guided out from the first housing part 12. The section of the third fluid duct 60 which is guided out form the first housing part 12 contains at its end the end section 20 onto which, for the supply of the third fluid duct 60 with hot water, a flexible duct can be connected for the supply of hot water.

The fluid duct group 22, consisting of the first fluid duct 56, the second fluid duct 58 and the third fluid duct 60, is combined to form one unit outside the first housing part 12, by the end sections 16, 18 and 20 of the respective fluid ducts 56, 58, 60 being connected securely with each other. The fluid duct group 22 is in addition connected as a whole securely with the first housing part 12. Thus, high mechanical stresses can be applied to the fluid ducts 56, 58 and 60 and in particular to the end sections 16, 18 and 20, without a break occurring. The fluid duct group 22 further contains fastening holes 23, via which the fluid duct group 22 (and hence the entire dispensing device 10) can be securely connected with a fastening section of a drink preparation machine (not shown). For example, connecting screws (not shown) inserted through the fastening holes can serve for the connection. FIG. 4 additionally shows two electric connections 39 which are arranged adjacent to each other between the end sections 18 and 20. The connections 39 are connected with electric leads (not illustrated in FIG. 4), which lead through the body 26 to the electric light source 38 (not illustrated in FIG. 4) (see FIGS. 1B and 3) and serve for the supply of the electric light source 38 with an electric current.

Figure 5:
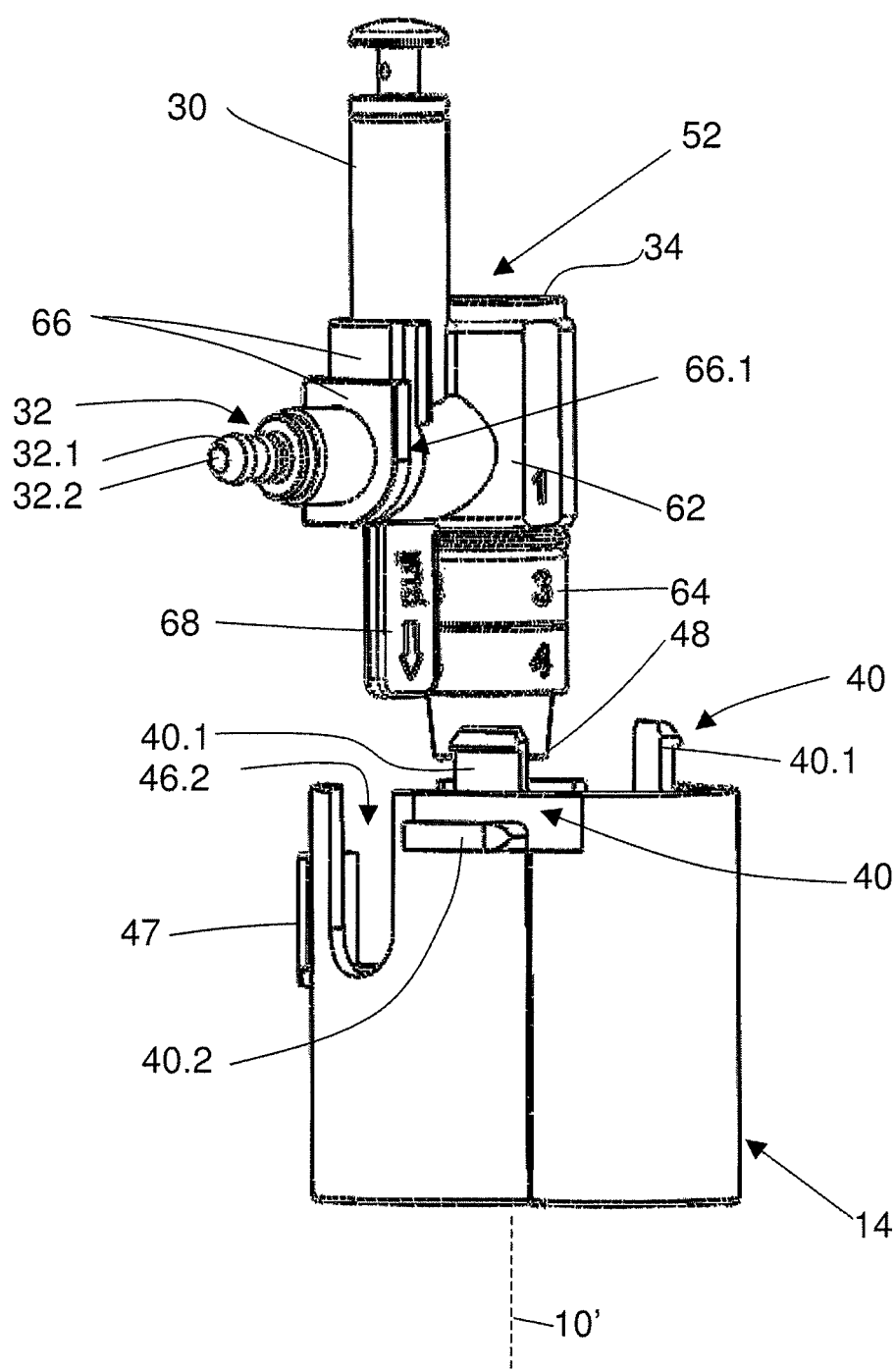
FIG. 5 illustrates a mixing arrangement and the second housing part according to FIG. 1A, wherein the mixing arrangement is removed from the second housing part.

FIG. 5 shows the mixing arrangement 52 and the second housing part 14 in a state in which the mixing arrangement 52 and the second housing part 14 are separated from each other, so that further details of the mixing arrangement 52 and of the second housing part 14 can be seen. As already mentioned, the mixing arrangement 52 contains the outwardly guided milk duct 32 and the air duct 30, via which respectively milk and air can be supplied. The milk duct 32 and the air duct 30 lead (downstream) respectively into a chamber 62. Steam can be injected into this chamber 62 via the already mentioned inlet opening 34, in so far as the already mentioned steam nozzle 54 is inserted into the inlet opening 34. In order to produce a particularly pressure-tight connection, the mixing arrangement 52 can be constructed in the region of the inlet opening 34 from an elastic material, for example rubber. The chamber 62 is constructed as a chamber within which an underpressure is able to be produced. More precisely, an underpressure is produced inside the chamber 62 by the supply of steam via the steam nozzle 54 and the inlet opening 34 according to the Venturi principle, so that milk and air are sucked into the chamber 62 via the milk duct 32 or respectively the air duct 30, with steam, milk and air mixing in the chamber 62. Downstream, the chamber 62 is connected with an emulsion chamber 64 within which a mixture of heated milk and/or milk foam, produced from the components steam, milk and air, can collect. The heated milk or respectively milk foam can be directed through the discharge pipe 48, connected downstream with the emulsion chamber 64, into a drinking vessel (not shown) placed beneath the mixing arrangement 52.

The mixing arrangement 52 contains a guidance section 66, which is formed on a section of the milk duct 32 and perpendicularly hereto. This guidance section 66 is constructed on its outer side in a shape which corresponds to the shape of the recess 46.2 constructed on the second housing part 14 (see FIG. 2). More precisely, the outer side of the guidance section 66 and the outer side of the second housing part 14 form a flush outer surface when the mixing arrangement 52 and the second housing part 14 are assembled together such that the guidance section 66 is introduced into the recess 46.2. As FIG. 6 indicates, the guidance section 66 has a groove 66.1. The groove 66.1 is shaped such that a section of the second housing part 14 must be introduced into the groove 66.1 and is guided in the groove 66.1 when the guidance section 66 is guided along the longitudinal axis 10' into the recess 46.2. The shaping of the guidance section 66 and the shaping of the recess 46.2 assist the user in inserting the mixing arrangement 52 correctly into the second housing part 14.

In FIG. 5 two (already mentioned) snap connection arrangements 40 can be clearly seen, which are formed on the upper side of the second housing part 14. The catches 40.1 of the respective snap connection arrangements 40 can also be clearly seen, which can be brought into engagement with engaging sections constructed on the first housing part 12, when the second housing part 14 and the first housing part 12 are assembled together. In order to be able to detach the respective catch 40.1 from the respective engaging section again, the snap connection arrangements 40 contain respectively a button 40.2. With a pressing of the respective button 40.2 by a user, the respective catch 40.1 is moved in the direction of the interior of the second housing part 14. Through this movement, in turn an engagement of the respective catch 40.1 into the associated engaging section is released, whereupon the second housing part 14 can be separated from the first housing part 12. After this separation, the mixing arrangement 52 can then be removed quickly and simply from the second housing part 14 by being drawn upwards. In so doing, the mixing arrangement 52 is guided via the respective connection between the guidance section 66 and the recess section 46 parallel to the longitudinal axis 10'.

As can be seen from FIG. 5, a (draw- and/or guidance) lug 68 is formed on the outer side of the mixing arrangement 52 in a region between the guidance section 66 and the discharge pipe 48. The lug 68 serves for example as a hand grip for a user and is useful for example when a mixing arrangement 52 (as illustrated in FIG. 4) is connected with the second fluid duct 58 such that the inlet opening 34 sits tightly on the steam nozzle 54, and the mixing arrangement 52 itself is then to remain adhered to the steam nozzle 54 when the second housing part 14 is separated from the first housing part 12 and removed. In this situation, a user can grasp the mixing arrangement 52 by the lug 68 and draw it manually out from the interior 12.1 of the first housing part 12 (which is explained in further detail below in connection with FIG. 7). Furthermore, the lug 68 can also be used in order to guide the mixing arrangement 52 on inserting into the recess 14.1 in the direction of the longitudinal axis 10'. For this purpose, on the second housing part 14 a guide can be constructed for the lug 68, with which guide the lug is able to be brought into engagement, for example a guide in the form of a groove running parallel to the longitudinal axis 10', into which the lug 68 is able to be inserted from above (not illustrated in FIG. 1-7). This guide for the lug 68 is preferably constructed in one piece with the material of the second housing part 14. Thus the user can detect quickly, simply and intuitively, i.e. without the assistance of information material, for example an operating manual, how the mixing arrangement 52 is to be inserted correctly into the second housing part 14. In addition, the lug 68 and a guide for the lug 68, constructed on the second housing part 14, can be shaped and arranged so that the mixing arrangement 52 is held securely, when the lug 68 is brought into engagement with this guide.

An advantage consists in that the mixing arrangement 52 can be separated from the second housing part 14 quickly, simply and without the actuation of connection elements. A further advantage consists in that the mixing arrangement 52, after cleaning under running water for example or after cleaning by means of a cleaning fluid, can be inserted quickly and simply into the second housing part 14 again. Thus, only a few and very simple steps are necessary in order to quickly and thoroughly clean this single component of the dispensing device 10, which comes in contact with milk. Through this simplicity, the user is advantageously encouraged to carry out this necessary cleaning in short time intervals.

Figure 6A:
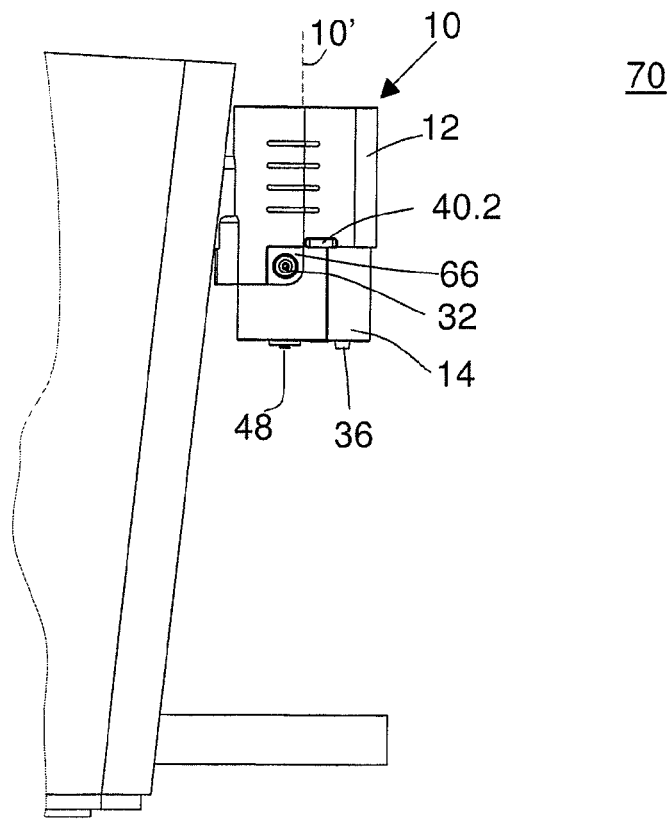
FIGS. 6A and 6B illustrate the dispensing device in assembled state, wherein the dispensing device is arranged on a drink preparation machine.
Figure 6B:
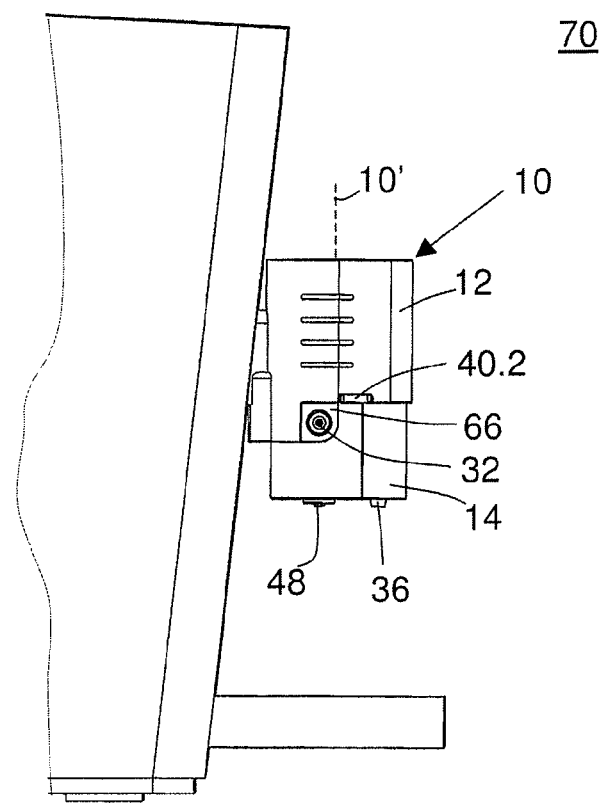

FIGS. 6A and 6B show—in a side view—a drink preparation machine 70 with dispensing device 10 which is arranged on an outer side of a housing of this drink preparation machine 70. The dispensing device 10 is vertically adjustable in its position, wherein FIG. 6A shows the dispensing device 10 in a maximum raised position and FIG. 6B shows the dispensing device 10 in a maximum lowered position. Thus, a user of the drink preparation machine 70 is presented with a great adjustment range for the height of the dispensing device 10, so that drinking vessels (not shown) of differing height can be used.

An advantage consists in that a drinking vessel placed beneath the dispensing device 10 does not need to be moved in the case of a simultaneous or else chronologically staggered delivery of coffee and milk foam. This is due to the fact that the end sections of the discharge pipe 48 and of the coffee discharge pipe 36 are arranged very close to each other. Thus, the fluids delivered from these discharge pipes 36 and 48 also flow into the drinking vessel when this drinking vessel has a small diameter.

Figure 7:
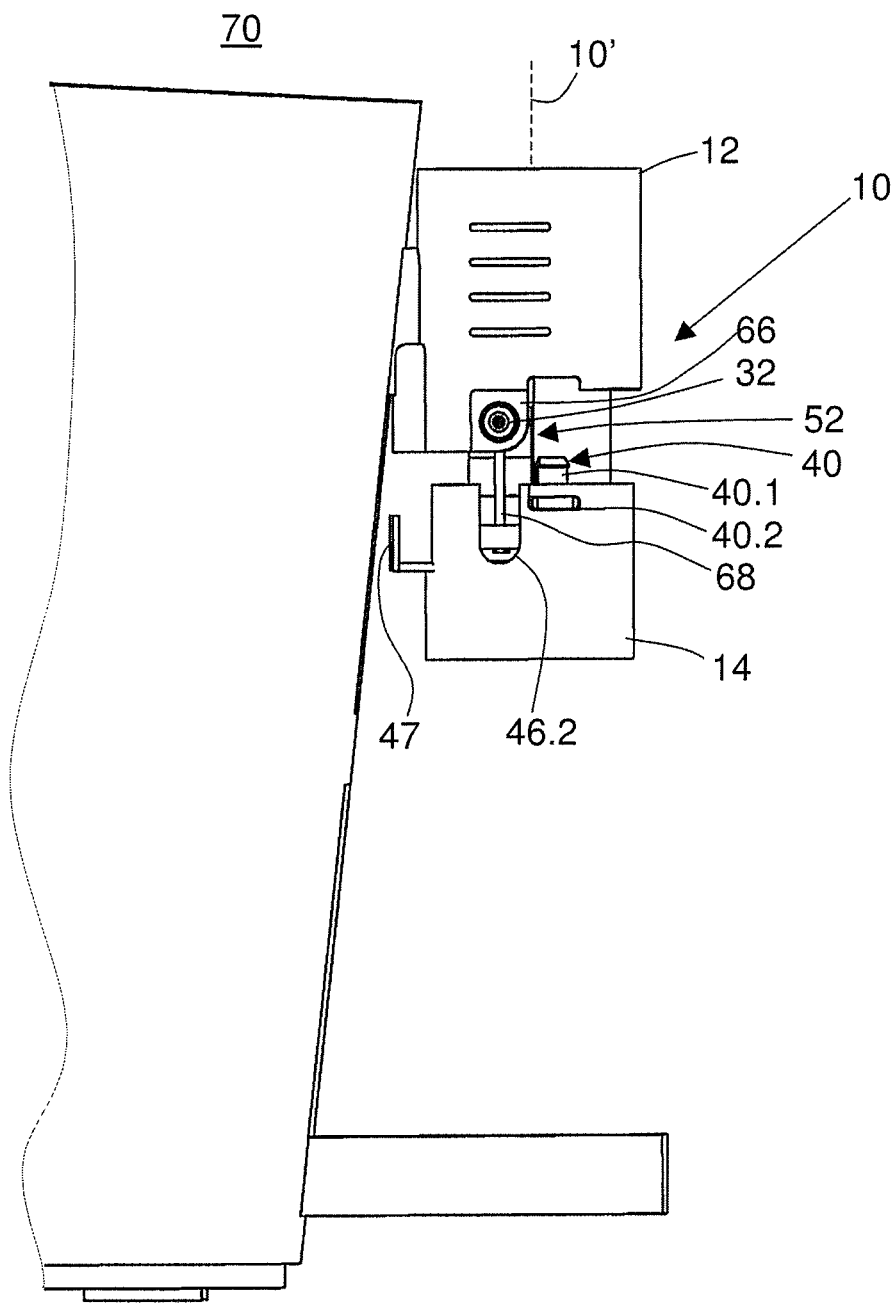
FIG. 7 illustrates the dispensing device illustrated in FIGS. 6A and 6B, wherein the second housing part is separated from the first housing part.

FIG. 7 shows the drink preparation machine 70 illustrated in FIGS. 6A and 6B, with the dispensing device 10 arranged thereon in a vertically adjustable manner. In this figure, the dispensing device 10 is shown in its maximum raised position. In addition, the dispensing device 10 is shown in a state in which the second housing part 14 is separated from the first housing part 12. For this purpose, the catch 40.1 of the respective snap connection arrangement 40 was released from the first housing part 12 by actuation of the respective button 40.2, so that the second housing part 14 can be moved downwards relative to the first housing part 12 parallel to the longitudinal axis 10'. In the view according to FIG. 7, the two housing parts 12, 14 are separated by a certain distance in vertical direction. As can be seen in this view, the mixing arrangement 52 remains on the first housing part 12, especially since in the illustrated state the inlet opening 34 of the mixing arrangement 52—as was explained in connection with FIGS. 4 and 5—is tightly connected with the steam nozzle 54 of the dispensing device 10 and hence can adhere to the steam nozzle 54 when the second housing part 14 is moved downwards. When under these conditions the second housing part 14 is moved downwards relative to the first housing part 12, the second housing part 14 is guided on the guidance elements of the first housing part 12 and the mixing arrangement 52 (i.e. in particular on the slot 28, the wall sections 28' and 28" and the body 26 of the first housing part 12 and the guidance section 66 and the lug 68 of the mixing arrangement 52), until the corresponding counter-guidance elements of the second housing part 14 (i.e. in particular the cross-piece 47, the wall sections 29' and 29", the guide ribs 44'-44'''' and the recess 46.2) are separated from the said guidance elements of the first housing part 12 and the mixing arrangement 52.

After the second housing part 14 has been entirely separated from the first housing part 12, the mixing arrangement 52 can be grasped by the lug 68 and drawn downwards out from the first housing part 12, in order to then be taken for cleaning. During this cleaning, milk and milk residues which adhere to particular areas of the mixing arrangement 52 are loosened and removed. After cleaning, the mixing arrangement 52 is inserted into the second housing part 14. This second housing part 14 is then placed onto the first housing part 12 and held on the first housing part 12 with the snap connection arrangements 40. In so doing, the mixing arrangement 52 is brought automatically into a position relative to the second fluid duct 58 or respectively to the steam nozzle 54, in which position a fluid connection is produced between the outlet opening 54.1 of the second fluid duct 58 or respectively the damp nozzle 54 and the inlet opening 34 (for steam) of the mixing arrangement 52. Thus, only very few steps are necessary in order to take the mixing arrangement 52 for cleaning. In addition, these steps are presented to the user intuitively without the assistance of information material. The user is thereby advantageously encouraged to carry out these necessary steps for cleaning the mixing arrangement 52 in short time intervals.

In the case of the dispensing device 10 illustrated in FIG. 1-7, the first fluid duct 56 opens out into a coffee discharge pipe 36, which is constructed in the body 26 and has an outlet opening 36.1 for coffee on an end section. Alternatively, several (for example two) coffee discharge pipes could also be constructed in the body 26, which can be connected respectively with the first fluid duct 56 for supply with coffee and can run in the body 26 for example parallel to each other. In addition, the respective coffee discharge pipe can also have several outlet openings for coffee.

Furthermore, the mixing device 52 can also have an adjustable valve by which the supply of milk via the milk duct 32 into the chamber 62 and/or the supply of air via the air duct 30 into the chamber 62 can be regulated. By means of this valve, the mixing ratio between air and milk can be varied, in order to be able to optionally produce heated milk (without an admixing of air) or milk foam (with an admixing of air).

That which is claimed is:

1. Dispensing device for the dispensing of coffee and/or milk and/or milk foam, which comprises:
    a fluid duct group for the supply of several fluids, which fluid duct group comprises at least a first fluid duct for the supply of coffee and a second fluid duct for the supply of steam, wherein the first fluid duct opens out into at least one coffee discharge pipe and the second fluid duct has an outlet opening for the steam;
    a mixing arrangement for the mixing of milk with steam and/or air, which mixing arrangement has a chamber, a milk duct for the supply of milk into the chamber, an air duct for the supply of air into the chamber, an inlet opening for the supply of steam into the chamber, and a discharge pipe for the dispensing of milk and/or milk foam out from the chamber;
    a housing which at least partially surrounds the fluid duct group, the respective coffee discharge pipe and the mixing arrangement,
    wherein the mixing arrangement is able to be brought into a first predetermined position relative to the second fluid duct, in which position a fluid connection is produced between the outlet opening of the second fluid duct and the inlet opening of the mixing arrangement for the supply of steam into the chamber,
    wherein the housing comprises at least a first housing part and a second housing part,
    wherein the fluid duct group is arranged on the first housing part or is constructed in the first housing part, wherein a recess to receive the mixing arrangement is constructed in the second housing part, the recess in the second housing part being configured to enable the mixing arrangement to be inserted into the recess such that the mixing arrangement is held at the second housing part in a second predetermined position relative to the second housing part, and wherein, if the mixing arrangement is received into the recess in the second housing part such that the mixing arrangement is held at the second housing part in the second predetermined position, the second housing part is configured to be placeable together with the mixing arrangement with respect to the first housing part so that the first housing part and the second housing part are able assembled together such that the mixing arrangement assumes the first predetermined position relative to the second fluid duct.

2. Dispensing device according to claim 1, in which the fluid duct group further contains a third fluid duct for the supply of hot water, which opens out into a hot water discharge pipe guided out from the first housing part.

3. Dispensing device according to claim 1, in which the first housing part comprises at least one guidance element and the second housing part a counter-guidance element, wherein on assembling together the first housing part and the second housing part, the respective guidance element is able to be brought into engagement with the counter-guidance element such that the first housing part and the second housing part are guided respectively against each other along a predetermined path.

4. Dispensing device according to claim 3, in which the guidance element and the counter-guidance element are constructed such that the guidance element is only able to be brought into engagement with the counter-guidance element when the second housing part is situated in a predetermined position relative to the first housing part.

5. Dispensing device according to claim 1, in which the second housing part contains a guidance arrangement which is designed such that the respective coffee discharge pipe on assembling together of the first housing part and of the second housing part is able to be brought into engagement at least partially with the guidance arrangement.

6. Dispensing device according to claim 1, in which the first housing part or the second housing part contains at least one snap connection arrangement with a catch, which is able to be brought into engagement with an engaging section which is constructed or arranged on the other respective housing part.

7. Dispensing device according to claim 1, in which the mixing arrangement contains a guidance section and the second housing part comprises a recess, wherein the recess is shaped such that the guidance section is able to be brought into a secure engagement with the recess.

8. Dispensing device according to claim 7, wherein the milk duct comprises an end section with an inlet opening for milk and the guidance section is arranged on this end section.

9. Dispensing device according to claim 1, in which the respective coffee discharge pipe is constructed in a body which contains an electric light source on an end section.

10. Dispensing device according to claim 1, in which the second housing part contains a first opening, through which an end section of the discharge pipe for the dispensing of milk and/or milk foam is able to be inserted, and a second opening, through which an end section of the respective coffee discharge pipe is able to be inserted.

11. Drink preparation machine with a dispensing device according to claim 1, wherein the first housing part is fastened on a housing wall of the drink preparation machine.

12. Drink preparation machine according to claim 11, wherein the dispensing device is arranged so as to be vertically adjustable.

* * * * *

UNITED STATES PATENT AND TRADEMARK OFFICE
CERTIFICATE OF CORRECTION

| | | |
|---|---|---|
| PATENT NO. | : 8,578,840 B2 | Page 1 of 1 |
| APPLICATION NO. | : 12/985138 | |
| DATED | : November 12, 2013 | |
| INVENTOR(S) | : Ullmann et al. | |

It is certified that error appears in the above-identified patent and that said Letters Patent is hereby corrected as shown below:

In the claims:

Column 17,
Line 15, Claim 1, "able assembled together" should read --assembled together--.

Signed and Sealed this
Eleventh Day of March, 2014

Michelle K. Lee
*Deputy Director of the United States Patent and Trademark Office*